(No Model.) 4 Sheets—Sheet 1.

J. HELM.
GRIP GEAR FOR CABLE STREET RAILROADS.

No. 394,855. Patented Dec. 18, 1888.

Witnesses:

Inventor,
John Helm
By Chas. E. Tisse
Attorney (No Model.) 4 Sheets—Sheet 2.
J. HELM.
GRIP GEAR FOR CABLE STREET RAILROADS.
No. 394,855. Patented Dec. 18, 1888.
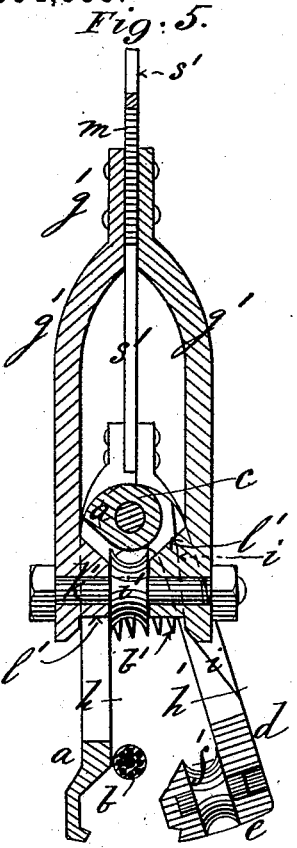
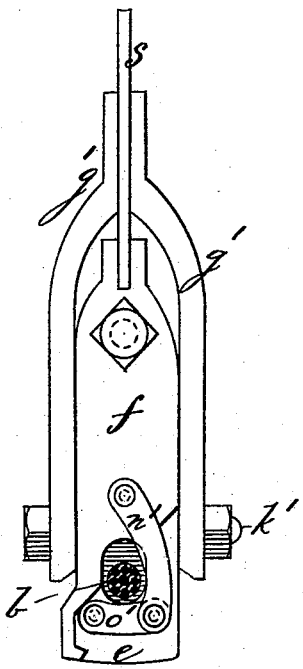
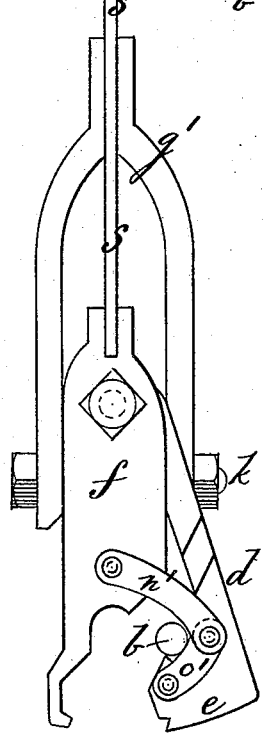
WITNESSES
INVENTOR
John Helm
By Wm. E. Fisse
Attorney (No Model.)   4 Sheets—Sheet 3.
J. HELM.
GRIP GEAR FOR CABLE STREET RAILROADS.
No. 394,855.  Patented Dec. 18, 1888.
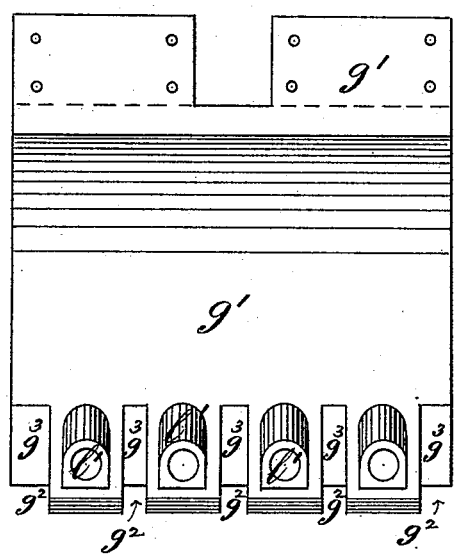
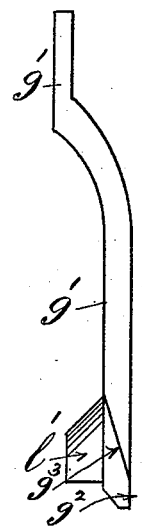

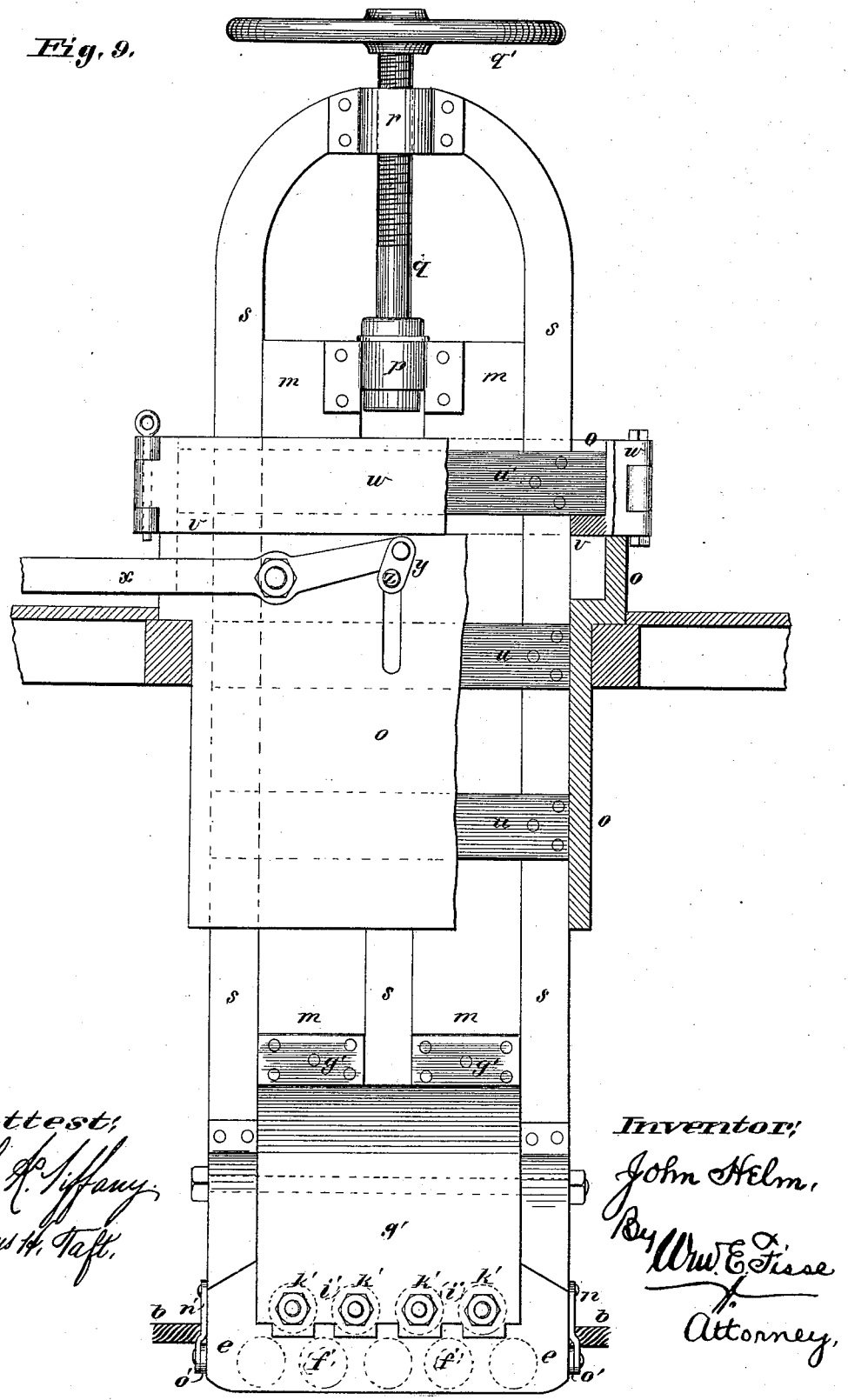

United States Patent Office.

JOHN HELM, OF OMAHA, NEBRASKA, ASSIGNOR TO LOUIS HELM, OF ST. LOUIS, MISSOURI.

GRIP-GEAR FOR CABLE STREET-RAILROADS.

SPECIFICATION forming part of Letters Patent No. 394,855, dated December 18, 1888.

Application filed April 9, 1888. Serial No. 270,089. (No model.)

*To all whom it may concern:*

Be it known that I, JOHN HELM, a citizen of the United States, residing at the city of Omaha, Douglas county, Nebraska, have invented new and useful Improvements in Grip-Gear for Cable Street-Railroads, of which the following is a specification.

The present invention is a modification of the invention described in Letters Patent No. 385,930, bearing date July 10, 1888, granted to me for improvements in grip-gear for cable street-railroads. The modification consists in substituting a fork-shaped yoke carried by upright sliding bars depending along the outer sides of the two jaws of the grip, combined with rollers mounted on spindles between the forks of the yoke and corresponding rollers along the lower hooked portion of the swinging jaw, for the rectangular-shaped yoke with its connecting cross-bars, combined with the concave ends of the upright sliding bars and the lower concave bearing-surface in the swinging jaw described and claimed in the above-mentioned patent.

The remaining parts of the grip and the operating mechanism and the means of connection to the car are similar in all respects to the corresponding parts described and illustrated in said patent, the whole operated in such manner that on turning the screw in one direction the upright sliding bars are lowered, carrying along with them in this movement the fork-shaped yoke, which closes the swinging jaw upon the fixed jaw and the intermediate inlying cable, the rollers of the yoke being lowered at the same time upon the cable and gripping the same against the corresponding rollers of the swinging jaw.

Figure 1:
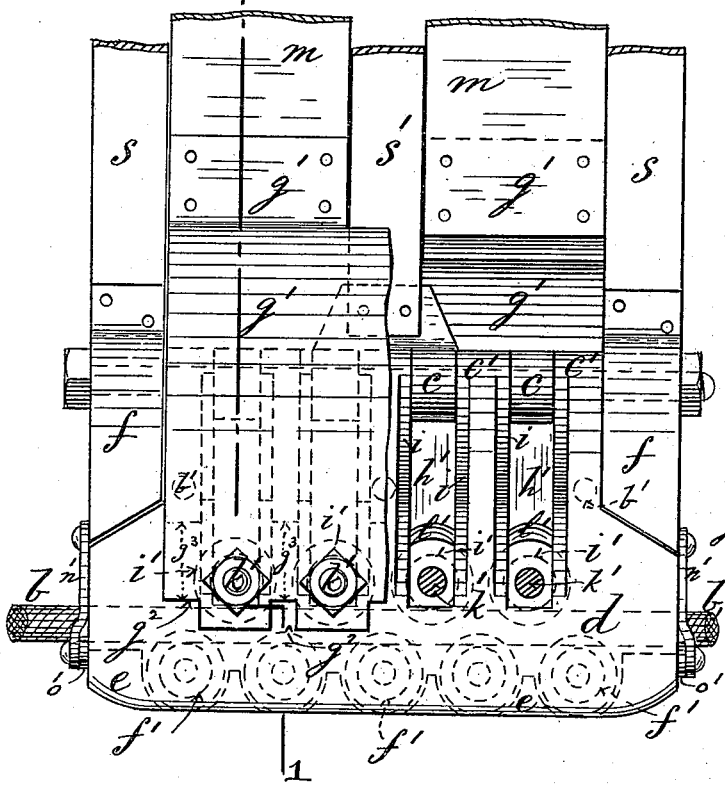
Figure 2:
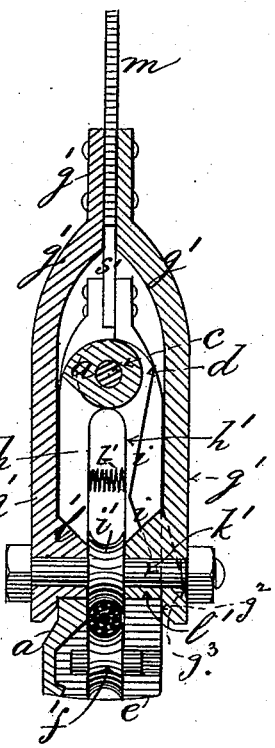
Figure 4:
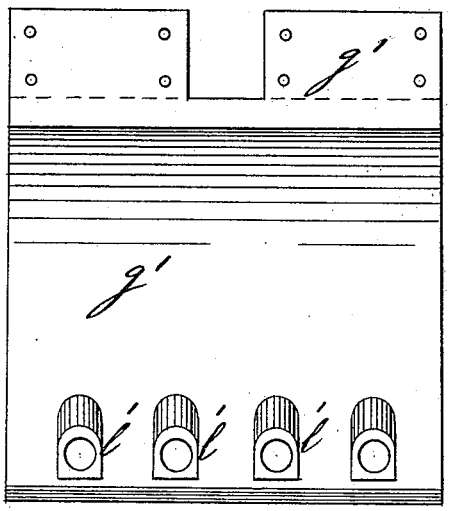

On the accompanying drawings, Figure 1 represents a side elevation, partly broken away, of my modified grip when closed or gripping the cable; Fig. 2, a transverse section on line 1 1 in Fig. 1; Fig. 3, an end view thereof; Fig. 4, an inside elevation of one side or fork of the yoke, seen to the left of Fig. 2 detached; Fig. 5, a transverse section following line 1 1 in Fig. 1 of the grip when fully open for dropping the cable; Fig. 6, an end view thereof; Fig. 7, an inside elevation of the other side or fork of the yoke, seen to the right of Fig. 2; and Fig. 8, an end view thereof. Fig. 9 is a side elevation of the grip with its connected operating mechanism and showing connection to floor of car, like letters of reference denoting like parts in all the figures.

The modified grip is composed of the fixed and swing jaws $a\,d$, which, with their respective slots $h\,h'$ and inclined ledges $i$, are similar in every respect to the corresponding parts in the said patent, except that in lieu of the concave bed along the lower hooked portion, $e$, of the swing-jaw $d$ a series of rollers, $f'$, for receiving the lower surface of the cable $b$ are substituted.

The jaws $a\,d$ are carried vertically by the side bars, $s$, and central bar, $s'$, of the grip-frame between the two sides or forks of a fork-shaped yoke, $g'$, which is attached at its upper part or shank to the upright sliding bars $m$ of the grip-gear. In the lower part of the yoke $g'$, midway between its sides or forks and in the space between the jaws $a\,d$, are pivoted a series of vertically-arranged rollers, $i'$, corresponding in number and distance apart with the slots $h\,h'$ of the jaws $a\,d$, and having the lower parts of their peripheries in a plane parallel with the cable $b$. The spindles $k'$ of these rollers $i'$ have their bearings in lugs $l'$, which project from the insides of the yoke $g'$ and occupy the slots $h\,h'$ of the jaws $a\,d$. The spindles $k'$ act as stays to the forks of the yoke $g'$, one of said forks on the side of the swing-jaw $d$ having bottom notches, $g^2$, and inner splayed recesses, $g^3$, for respectively effecting the inward and permitting the outward movement of the swing-jaw $d$ on its fulcrum, as hereinafter more particularly referred to.

The sliding bars $m$, side bars, $s$, and central bar, $s'$, are connected with the operating mechanism and grip-frame, which are located above the floor of the car. The operating mechanism of the grip and the grip-frame, and the means for dropping the cable and recovering the same, are similar in construction and operation to the analogous parts described in said patent, and need no further description. All of these parts are clearly shown in Fig. 9. The grip is secured to floor of the car in any suitable manner.

In the operation of my modified form of grip, the various parts being in such relative positions that the grip with its frame is at the normal level for gripping the cable $b$, which is running over the peripheries of the rollers $f'$ in the swing-jaw $d$, the latter being somewhat open in the direction shown in Fig. 5, or in its normal position for releasing the grip on the cable without dropping the latter, on rotating the operating-screw by its handle in one direction the sliding bars $m$ will be lowered, and, carrying with them the forked yoke $g'$, the shoulders of the notches $g^2$ will ride over the lower inclined ledges $i$ of the slots $h'$ and so constrain the swing-jaw $d$ toward the fixed jaw $a$ until the shoulders of the notches $g^2$ reach the vertical outer surface of the swing-jaw $d$, when the latter will be fully closed against the fixed jaw $a$, as seen in Figs. 2 and 3, and compress the springs $b'$. Simultaneously the peripheries of the rollers $i'$, carried by the yoke $g'$, are lowered upon and grip the cable $b$ against the peripheries of the rollers $f'$ in the swing-jaw $d$.

On rotating the screw in the opposite direction the rollers $i'$ of the yoke $g'$ will be raised from the cable $b$, and the shoulders of the notches $g^2$, leaving the vertical surface of the swing-jaw $d$, will enter the depressions formed by the inclined ledges $i$, and thereby allow the swing-jaw $d$ to be thrown outward to the extent allowed by the splayed recesses $g^3$ on its fulcrum by the springs $b'$ into its original position, or so as to release the grip from the cable $b$. When it is required to drop the cable $b$ clear of the grip, the sliding bars $m$ and forked yoke $g'$ are further raised by the screw so as to allow the swing-jaw $d$ to be forced by the springs $b'$ into the position shown in Figs. 5 and 6, when the cable $b$ will drop from the rollers $f'$. The method of recovering the cable $b$ after being dropped and raising the entire mechanism again to its normal level is the same as that described in the said patent.

$n'$ $o'$ represent links, which are coupled, respectively, at one end to the ends of the jaws $a$ $d$, and at their other ends to each other for insuring the positive dropping of the cable $b$ as the swing-jaw $d$ opens, by constraining the cable $b$ to leave the rollers $f'$ on the swing-jaw $d$, reaching the position seen in Figs. 5 and 6.

I claim—

In a cable-road grip-gear, the combination of a fixed jaw, $a$, carried by grip-frame on car, swing-jaw $d$, hinged to fixed jaw $a$ and having rollers $f'$, slots $h$ $h'$, formed through said jaws, and having recesses $i$, forked yoke $g'$, carried by sliding bars $m$, and having inner projecting lugs $l'$, lower notches, $g^2$, and splayed recesses $g^3$, with rollers $i'$ mounted on spindles $k'$, and springs $b'$, substantially as and for the purpose described.

JOHN HELM.

Witnesses:
W. E. L. PEARCE,
WM. ROSENBROOK.